United States Patent [19]

Plumer

[11] Patent Number: 5,097,686
[45] Date of Patent: * Mar. 24, 1992

[54] SECURITY LOCKING SYSTEM FOR VEHICLE WHEEL NUTS

[75] Inventor: Mark J. Plumer, Los Angeles, Calif.

[73] Assignee: Consolidated International Automotive, Inc., Los Angeles, Calif.

[*] Notice: The portion of the term of this patent subsequent to Oct. 3, 2006 has been disclaimed.

[21] Appl. No.: 678,449

[22] Filed: Apr. 1, 1991

Related U.S. Application Data

[63] Continuation of Ser. No. 402,539, Sep. 5, 1989, abandoned, which is a continuation of Ser. No. 138,565, Dec. 28, 1987, Pat. No. 4,870,842.

[51] Int. Cl.⁵ .............................................. F16B 41/00
[52] U.S. Cl. ...................................... 70/232; 70/346; 70/404
[58] Field of Search ............... 70/232, 346, 347, 404, 70/420, 491, 229-231, DIG. 57, 403, 158, 163, 165, 351, 356, 378

[56] References Cited

U.S. PATENT DOCUMENTS

| | | | |
|---|---|---|---|
| 804,387 | 11/1905 | Davis | 70/232 X |
| 877,930 | 2/1908 | Katzenberger | 70/404 |
| 1,499,211 | 6/1924 | Giralico | 70/420 |
| 1,556,242 | 10/1925 | Murphy | 70/420 |
| 1,625,901 | 4/1927 | Lay | 70/232 |
| 1,741,593 | 12/1929 | Trautner | 70/232 |
| 1,804,955 | 5/1931 | Schlumpf | 70/346 |
| 2,352,967 | 7/1944 | Noble | 70/232 |
| 2,721,470 | 10/1955 | Hensel | 70/346 |
| 3,605,460 | 9/1971 | Singer et al. | 70/232 |
| 3,739,612 | 6/1973 | Schultz | 70/380 |
| 3,817,065 | 6/1974 | Sander | 70/232 |
| 4,191,036 | 3/1980 | Steinbach | 70/491 |
| 4,574,602 | 3/1986 | Furuse | 70/232 |
| 4,838,060 | 6/1989 | Hutzenlaub | 70/404 X |
| 4,870,842 | 10/1989 | Plumer | 70/404 X |

FOREIGN PATENT DOCUMENTS

| | | | |
|---|---|---|---|
| 1245 | of 1869 | United Kingdom | 70/346 |
| 2075108 | 11/1981 | United Kingdom | 70/346 |

*Primary Examiner*—Lloyd A. Gall
*Attorney, Agent, or Firm*—Robert S. Schaap

[57] ABSTRACT

A security locking system primarily for use in the locking of a threaded retaining member onto a vehicle wheel. In one embodiment, the threaded retaining member may adopt the form of wheel lug nuts which are threaded onto the threaded studs of a vehicle wheel. The locking system comprises a sleeve or so-called "cover" extendable over the retaining member. A locking mechanism is mounted in an end wall of the sleeve. The locking mechanism is provided with a locking element which is extendable radially for engagement with a groove in the wheel lug and provides a positive locking action. The locking mechanism is provided with a cylindrically shaped key slot and has projections in the key slot. A key is provided with certain grooves alignable with the projections in the key slot to receive the key such that only the key having the aligned and properly sized recesses can be used to open and close the locking element. In this way, a conventional tumbler system normally used in most vehice wheel locks can be avoided.

29 Claims, 4 Drawing Sheets

SECURITY LOCKING SYSTEM FOR VEHICLE WHEEL NUTS

RELATED APPLICATIONS

This application is a continuation of my copending patent application Ser. No. 402,539, filed Sept. 5, 1989 for "Security Locking System" (now abandoned) and which was a continuation of my earlier then co-pending patent application Ser. No. 138,565, filed Dec. 28, 1987 for "Security Locking System" (now U.S. Pat. No. 4,870,842 dated Oct. 3, 1989).

BACKGROUND OF THE INVENTION

1. Field of the Invention

This invention relates in general to certain new and useful improvements in security locking systems, and more particularly, to a security locking system which utilizes a unique key-lock combination and which does not require a tumbler action lock.

2. Brief Description of the Prior Art

In recent years, there has been an increased incidence in automotive vehicle theft and also in the theft of components from automotive vehicles. Due to the substantial cost of vehicle wheels and vehicle wheel covers, these components have been the subject matter of a high rate of theft incidence. The average thief can jack-up a vehicle and within a matter of minutes, remove all four wheels from a vehicle. In order to protect against this type of theft problem, many vehicle owners have resorted to security locking devices for the wheel lug nuts and wheel bolts.

There are essentially two types of security wheel locking devices which are commercially available. The first of these security wheel lug nut locking devices resides in the use of a conventional locking mechanism which engages the wheel lug nut or bolt in some operative action to preclude removal of the lug nut or bolt when the lock is in the locked state. This locking device utilizes a conventional tumbler action lock. Thus, the locking device is provided with a conventional key slot receiving a conventional key which causes movement of the tumblers in a conventional locking fashion to open or close the lock.

The second type of security wheel lug locking system which is employed relies upon the use of a lug nut which is threaded onto the vehicle wheel bolt-shaft or stud or otherwise a bolt which is threaded into an internally threaded hole in the wheel. In either case the bolt or nut serves as a retainer member which has an outer end with an unusual or irregular shape or with an interior bore having an unusual or irregular shape designed to receive a special lug nut removal tool. In this case, only a party having the special lug nut wrench can remove the lug nut. Thus, the user of this type of lug nut locking device is required to carry a special wrench, or otherwise, an adaptor for a conventional wrench and which adaptor will fit the particular lug nut locking devices.

Each of the prior art locking devices have somewhat limited effectiveness for several reasons in addition to those mentioned above. These prior art locking devices, by virtue of their design, are elongate in construction. Because they use conventional locking mechanisms these prior art devices must be elongate to enable a tumbler locking action. Since they extend radially with respect to the rim of the wheel their dimension and weight creates an unbalanced force on the wheel.

The conventional tumbler operated locking mechanisms are also complex in construction and have a substantial amount of weight. It would be desirable to provide a locking mechanism which is light in weight and simple in construction which would also reduce the cost of manufacture. In addition, there are many applications where space is at a premium. Therefore, it is desirable to provide a locking device which can operate within a small amount of space.

The conventional tumbler locks also have limited effectiveness since they easily become fouled by dirt or other foreign matter. Due to the proximity of the wheel to the road surface, foreign matter quickly accumulates within the actual locking mechanism, thus interfering with the proper operation of the locking mechanism. After a period of time, due to the accumulation of foreign matter, such as road surface dirt, the tumbler lock is rendered unusable. Inasmuch as only one key is used for all of the lug nut locking devices, if one of the locking devices should become inoperative, it is necessary for the user to replace all of the lug nut locking devices on the vehicle. When considering the fact that each vehicle wheel may have up to five or more individual lug nut locks, this can become an expensive undertaking.

OBJECTS OF THE INVENTION

It is, therefore, one of the primary objects of the present invention to provide a security locking system which utilizes a unique key-lock combination and which does not rely upon the need of a conventional tumbler operated lock.

It is another object of the present invention to provide a security locking system of the type stated which is highly effective for use with automotive vehicle wheels to preclude the incidence of theft of the vehicle wheels.

It is a further object of the present invention to provide a wheel lug nut or bolt locking device of the type stated which does not required the use of tumbler operated locks and which does not require special wrenches therefor.

It is an additional object of the present invention to provide a security locking system of the type stated which can be manufactured at a much lower cost than the conventional security locking systems and which is highly effective in operation.

It is another salient object of the present invention to provide a security wheel lug locking system in which a sleeve housing is disposed over a wheel lug nut or bolt and is freely rotatable thereon when in the locked position to thereby preclude unauthorized removal of the wheel nut or bolt.

It is still another object of the present invention to provide a security lug locking device of the type stated in which a key way is provided in the form of a cylindrically shaped slot having projections therein arranged with respect to recesses on a cylindrically shaped key to permit entry into and actuation of the locking device by the key.

It is also an object of the present invention to provide a security locking system of the type stated which is constructed in a very small compact unit and which is capable of being used on or near the rim of a vehicle wheel without adding any substantial unbalancing forces to the vehicle wheel.

With the above and other objects in view, my invention resides in the novel features of form, construction, arrangement and combination of parts presently described and pointed out in the claims.

BRIEF SUMMARY OF THE INVENTION

In a broad aspect, the present invention is directed to a security locking system in which a threaded retaining member is retentively held on a fixed structure by a theft-proof assembly, as hereinafter described. In a more preferred embodiment, the invention is directed to a security wheel lug locking system. In one aspect the lug may be considered as a part of the system and in another aspect, a generally conventional lug nut or bolt may be used with the system.

The term "retaining member" is used in a broad sense to include essentially any form of threaded members such as a bolt or a nut which is capable of being engaged onto a threaded fixed structure by a turning action. Thus, in the case of a wheel lug device, the lug may adopt the form of a lug nut or a lug bolt. In the case of the lug nut, the nut is threadedly secured onto a threaded shaft or so-called "stud" projecting outwardly from the wheel of a vehicle. In the case of a lug bolt, the bolt is provided with a threaded shank for turning into and threadedly engaging an internally threaded hole in the vehicle wheel. In either case, the lug device serves as a threaded retaining member such that it functions to retain some other member, as for example, a vehicle wheel onto a wheel hub like structure.

The wheel lug nut is similar to prior art wheel lug nuts in that it includes a body having an internal bore with an internally threaded section in the bore for threaded engagement with the lug nut receiving bolt or so-called "stud", which projects outwardly from the surface of the vehicle wheel. As indicated above, the retaining member, such as the nut or bolt, may be considered as part of the system, or the nut or bolt may be any nut or the bolt, which may be modified, if required, to be used with the security locking system of the present invention.

The wheel lug nuts used with the invention, each must have an internally formed circumferential groove located to receive a locking element or so-called "slide" forming a part on a portion of the locking system, in a manner to be hereinafter described in more detail. In like manner, the wheel lug bolts used with the invention usually include a central bore in one portion thereof. This bore must also have a circumferential groove located to receive the locking element or slide forming a part of the locking system.

The security wheel lug locking system of the present invention includes a sleeve housing which is adapted to extend over a wheel lug nut or bolt when the latter has been secured onto a wheel plate or similar structure and projects outwardly from a surface of the vehicle wheel plate. This sleeve is freely rotatable over the wheel lug nut or bolt, particularly when in the locked position. In this way, unauthorized removal of the wheel lug nut or bolt cannot be achieved by someone attempting to engage a cylindrically shaped housing of the sleeve with a wrench or other implement in an attempt to un-thread the wheel lug nut or bolt.

A locking mechanism is carried by the sleeve housing but is spaced from the interior surface of the sleeve housing, thereby forming an annular space between the sleeve housing and the locking mechanism. The outer end of the wheel lug nut or bolt is capable of being received within this annular space in surrounding relationship to the locking mechanism.

The locking mechanism is mounted on the flat outer wall of the sleeve-housing and projects into the interior portion thereof. An annular key receiving slot is formed within the outer end wall of the sleeve housing and within the locking mechanism to receive a manually operable key. The key receiving slot is formed with a plurality of projecting elements and which are arranged in a predetermined pattern. The key, which is user operable, is an arcuately shaped key, and preferably a circularly shaped key, having recesses located to be received by the projections in the key receiving slot.

A plurality of different locking mechanisms and key combinations may be provided by altering the arrangement of the projecting elements in the key slot and the recesses on the key. Thus, for a key to fit a particular locking mechanism, the recesses must be precisely aligned with and have sizes sufficient to pass by the projections in the key slot.

When a key is inserted into the cylindrically shaped key slot, entry of the key can be afforded if the recesses are aligned with the projecting elements, which thereby allows the key to be inserted into the locking mechanism past the projecting elements. A tab on the key will then engage with a locking element or so-called "slide", forming part of the locking mechanism, and by a camming action, force the same into the groove formed in the lug nut. In like manner, when it is desired to unlock the security locking device, the key is rotated in the opposite direction, causing removal of the locking element from the groove in the sleeve housing and which permits removal of the sleeve housing from the lug nut or bolt.

In accordance with the present invention, the particular arrangement of the projecting elements and the recesses in the key can be altered from one locking mechanism to another locking mechanism, such that only one key is operable with a particular locking mechanism. Thus, by changing the circumferential spacing between the various recesses in the key and correspondingly changing the circumferential spacing of the projections in the key receiving slot, a different locking mechanism pattern is created The security locking system of the present invention provides a locking device which is highly effective for use as a vehicle wheel locking mechanism inasmuch as it can be constructed so as to assume a very small amount of space. In this respect, the locking device is essentially of a disk type of construction in that it has a very small thickness. As a result, it is not only light in weight, but more importantly, it does not extend radially from the rim of the wheel for any substantial distance. As a result, this locking device causes little or no unbalancing of the wheel which is common with other types of locking devices. Furthermore, the locking device of the present invention is very light in weight and is operable with a minimum number of components and thereby enables the device to be manufactured at a relatively low cost. The various parts of the locking device can be constructed at a much lower cost when compared to a tumbler operated locking mechanism.

This invention possesses many other advantages and has other purposes which may be made more clearly apparent from a consideration of the forms in which it may be embodied. One of these embodiments is hereinafter described in the detailed description of the invention, with reference to the drawings forming a part of and accompanying the present specification. This embodiment will now be described in detail for the purposes of illustrating a practical embodiment and the general principles of the invention, but it is to be understood that such detailed description is not to be taken in a limiting sense.

BRIEF DESCRIPTION OF THE DRAWINGS

Having thus described the invention in general terms, reference will now be made to the accompanying drawings (three sheets) in which:

DETAILED DESCRIPTION OF A PREFERRED EMBODIMENT

Figure 1:
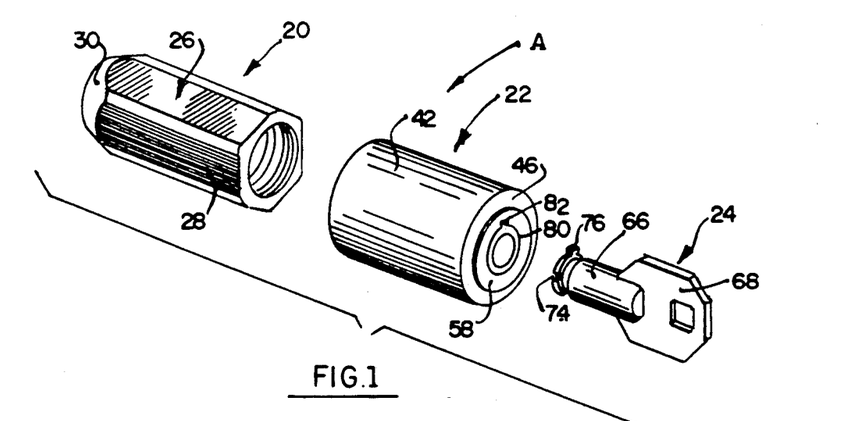
FIG. 1 is an exploded perspective view of a security wheel locking system constructed in accordance with and embodying the present invention.
Figure 2:
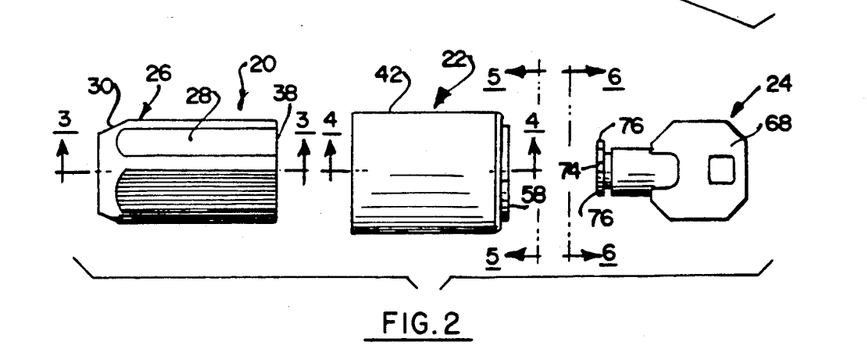
FIG. 2 is an exploded side elevational view of the security wheel locking system of FIG. 1.

Referring now in more detail and by reference characters to the drawings which illustrate a practical embodiment of the present invention, A designates a wheel lug nut locking system of the present invention which is comprised of a wheel lug nut 20 and a sleeve or cover 22 and a key 24, as best illustrated in FIG. 1 of the drawings.

The lug nut 20 is essentially conventional in its construction, except for a slight modification as hereinafter described. In this case, the lug nut 20 is hexagonal in its outer cross-sectional shape and is comprised of a body 26 which is elongate and which is provided with hexagonally arranged outer walls 28. In this respect, the lug nut body 26 is adapted to be received in a conventional wrench socket. At one end, the body 26 is provided with a tapered section 30 to fit within an opening of a wheel in a conventional manner.

Figure 3:
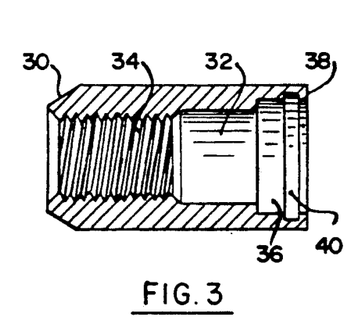
FIG. 3 is a sectional view taken along line 3—3 of a portion of FIG. 2 and showing the interior construction of a lug nut.

The lug nut 20 is also provided with an internal bore 32 extending therethrough in the manner as illustrated in FIG. 3 of the drawings. A portion of the bore 32 is provided with an internally threaded section 34 for mating with an external thread on a wheel bolt or stud (not shown).

The above described construction of the wheel nut 20 is essentially conventional. The wheel lug nut 20 may be slightly modified for use with the wheel lug nut locking mechanism of the present invention and, in this case, is provided with an enlarged bore section 36 adjacent an end 38 which is opposite the tapered end section 30. The enlarged bore section 36 is also provided with a circumfrentially extending groove 40, for reasons which will presently more fully appear. In this respect, the end 38 is often referred to as an "outer end" inasmuch as the lug nut 20 is placed on a wheel in a manner in which the tapered end 30 projects inwardly toward the wheel of the vehicle, and the end 38 projects outwardly from the wheel.

In can be observed that the wheel locking lug nut 20 can be easily removed from the bolt or so-called bolt stud projecting outwardly from the wheel of a vehicle by means of a conventional socket wrench. In this respect, a conventional socket wrench would fit over the outer end 38 and would be provided with walls to engage the flat walls 28 of the lug nut 20. By turning the lug nut 20, in the proper direction, it will be un-threaded from the externally threaded stud of the wheel.

The security locking system of the present invention has been described in connection with the use of a vehicle wheel lug nut. However, it should be understood that a lug bolt would be operable in essentially the same manner as the lug nut is operable. The bolt is usually also provided with an elongate shank which is externally threaded. Moreover, a portion extends outwardly from the shank and includes a central bore much in the same manner as the lug nut itself.

The present invention provides the sleeve 22 which is adapted to be circumferentially disposed about the lug nut 20. The sleeve 22 is provided with a cylindrically shaped outer wall 42 and which forms an interior central bore 44, the latter being sufficiently large in diameter so as to be slideably disposed over the lug nut 20. The cylindrically shaped side wall 42 is integrally connected to a relatively flat transverse end wall 46 in the manner as illustrated in FIGS. 1, 2, 4, and 5 of the drawings.

As indicated previously, the sleeve 22 is capable of being axially shifted along the lug nut 20 so that it is capable of being completely disposed thereover. When in this position, the bore 44 of the sleeve 22 is sufficiently large so that the sleeve 22 may literally be rotated on the lug nut 20. Thus, and in this position, when the sleeve 22 is locked onto the lug nut 20, in a manner to be hereinafter described in more detail, it is virtually impossible to rotate the lug nut and thereby remove the same from the stud of the wheel.

The end wall 46 of the sleeve 22 carries a locking mechanism 50 for purposes of locking the sleeve 22 onto the lug nut 20. The locking mechanism 50 is fitted within an opening 52 in the end wall 46 and retentively held therein by a conventional securement means, as for example, by welding or brazing the same to the flat end wall 46. The locking mechanism 50 is comprised of a somewhat disk-shaped outer housing 54 having a cylindrically shaped outer side wall 56 and an outwardly presented flat end wall 58, as well as an inwardly presented flat end wall 60, reference being made to FIGS. 4, 4A, 8, and 13 of the drawings.

Figure 4:
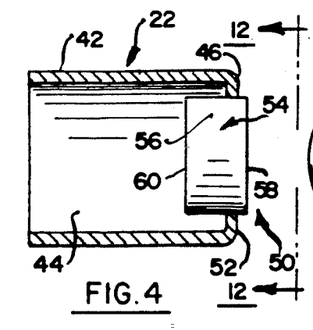
FIG. 4 is a sectional view taken along line 4—4 of a portion of FIG. 2 and showing the sleeve housing in sectional view, but not showing the key locking mechanism in section.
Figure 4A:
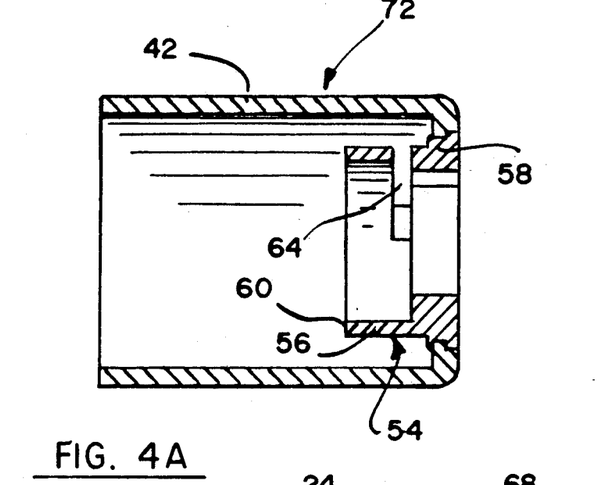
FIG. 4A is a sectional view, similar to FIG. 4, but showing the housing of the key locking mechanism in cross-section in the sleeve housing.
Figure 8:
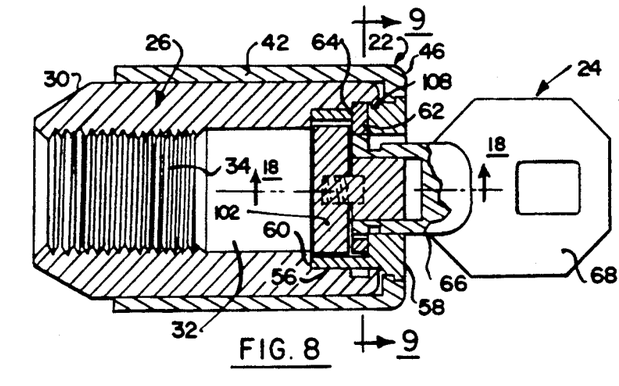
FIG. 8 is a sectional view showing the sleeve housing disposed over a wheel lug nut and with the key inserted into the key slot of the locking mechanism.
Figure 13:
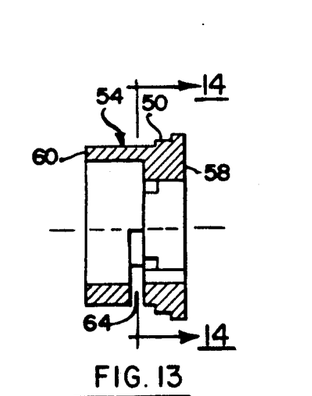
FIG. 13 is a sectional view of a locking mechanism body with the locking mechanism components removed therefrom.
Figure 14:
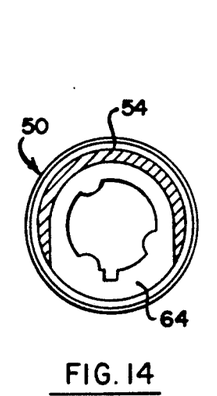
FIG. 14 is a sectional view of the locking mechanism body in a position taken transverse to the body along line 14—14 of FIG. 13.
Figure 15:
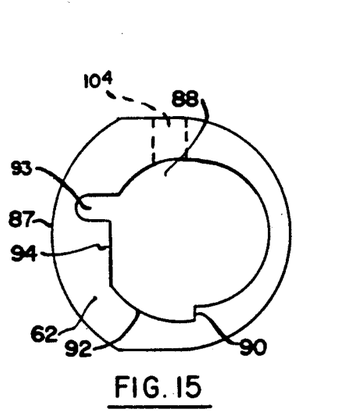
FIG. 15 is a plan view of a locking element or so-called slide forming part of the locking mechanism.

FIG. 4 shows the locking mechanism in elevation, as mounted in the sleeve 22, the latter being shown in cross-section. FIG. 4A is similar to FIG. 4 and shows the housing 54 of the locking mechanism 50 in cross-section. The locking mechanism 50 carries a radially shiftable locking element 62 (more fully illustrated in FIG. 15) which is capable of shifting outwardly of the locking mechanism housing 54 through a slot 64 formed in the housing, as best illustrated in FIGS. 8 and 13 of the drawings. Thus, when the lock is actuated and moved to the locked position, as hereinafter described in more detail, the locking element 62 will be biased outwardly of the locking mechanism housing 54 and into the groove 40 of the lug nut 20. Thus, the sleeve 22 will be retentively held onto the lug nut 20.

Inasmuch as the groove 40 is continuous and extends annularly around the enlarged interior bore section 36, the locking element 62 will move within the groove 40.

Thus, the sleeve 22 will be rotatable about the lug nut 20. However, when in the locked condition, the locking element 62 being fitted within the groove 40 will preclude axial shifting movement, and hence, preclude removal of the sleeve 22 from the lug nut 20. In like manner, when the lock is shifted to the unlocked position, the locking element 62 is retracted within the housing 54, thereby permitting axial shifting movement and hence, removal of the sleeve 22 from the lug nut 20.

The locking mechanism is operable by means of the key 24, the latter of which is more fully illustrated in FIGS. 1, 2 and 6–8 of the drawings. The key 24 is provided with a cylindrically shaped key shank 66 and an enlarged head 68 which is adapted for engagement by the fingers of a user. The shank 66 is tubular in construction such that it has an interior central bore 69. At its innermost end, that is the left-hand end, reference being made to FIGS. 1, 2 and 7 of the drawings, the shank 66 is provided with a diametrically reduced section 70. Integrally connected to the diametrically reduced section 70 is a rim 72 having a plurality of recesses 74 spaced on the periphery of the rim 72. In addition, an outwardly projecting tab 76 extends from the rim 72 in the manner as illustrated in FIGS. 1, 2, 6 and 7 of the drawings.

Figure 5:
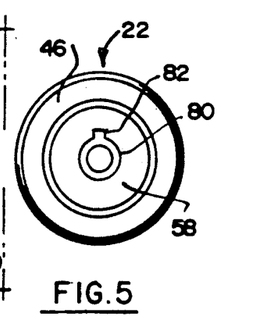
FIG. 5 is an end elevational view taken substantially along the plane of line 5—5 of FIG. 2 and showing the key receiving slot to receive a key forming part of the system of the present invention.
Figure 6:
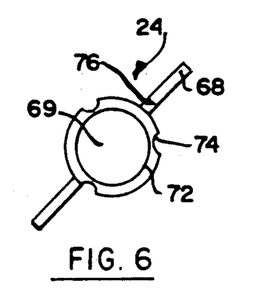
FIG. 6 is an end elevational view of the key taken along the plane of line 6—6 of FIG. 2 and showing an end view of the key forming part of the system of the present invention.
Figure 7:
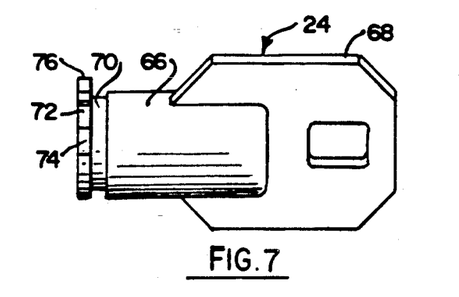
FIG. 7 is an enlarged side elevational view showing a portion of the shank of the key of the present invention.

The shank 66 and the rim 72 thereon are sized to fit within a circularly shaped key receiving slot 80 formed on the outer wall 58 of the locking mechanism housing 54, in the manner as illustrated in FIGS. 1 and 5 of the drawings. The slot has an outer opening which leads into a circularly shaped interior bore in the housing 54. Moreover, the circularly shaped slot is provided with a radially outwardly extending keyway 82 in order to receive the tab 76 on the rim 72 of the key 24. Thus, the key 24 can be inserted into the key slot 80 in only one orientation, that is, when the tab 76 is aligned with the keyway 82.

Figure 10:
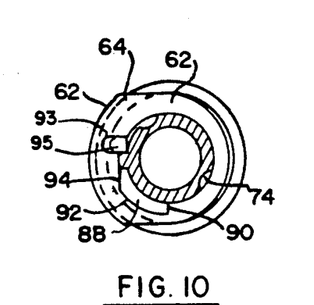
FIG. 10 is a somewhat schematic sectional view transverse to the central axis of the sleeve housing and showing a locking element forming part of the locking mechanism in a locked position.
Figure 11:
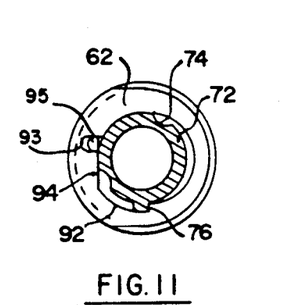
FIG. 11 is a somewhat schematic sectional view, similar to FIG. 10, but showing the locking element forming part of the locking mechanism in the unlocked position.

It can be observed that the key shank 66 will fit within the key slot 80 since the shank itself is of a tubular construction. In this way, when the key shank 66 is inserted into the locking mechanism 50, it can operate the locking mechanism in order to cause a shiftable outward movement of the locking element 62 (FIG. 10) or an inward shifting movement of the locking element 62 (FIG. 11). Thus, when the key shank 66 is inserted into the key slot 80 and turned in one direction, such as a clockwise direction, it will cause movement of the locking element 62 outwardly of the housing 54 and into the groove 40 of the lug nut 20. When the key is rotated in the opposite direction, such as for example, the counter-clockwise direction, it will cause movement of the locking element 62 back into the locking mechanism housing 54 and thereby permit removal of the sleeve 22 from the lug nut 20.

Figure 12:
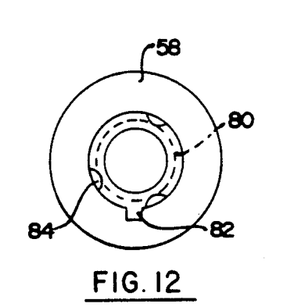
FIG. 12 is an end elevational view taken along the plane of line 12—12 of FIG. 4 and showing a portion of the key receiving slot forming part of the locking mechanism.

The locking mechanism is provided with a plurality of projections 84 which extend into the key slot 80, as shown in FIG. 12, and which would otherwise block the key from entering into the key slot except for the recesses 74 formed in the rim 72. Thus, the shank 66 of the key 24 will be allowed to pass into the key slot 80 if the recesses 74 on the rim 72 are aligned with and have the same size and arrangement as the projections 84 in the key slot 80. When the key fits into the key slot 80, the tab 76 on the key will engage the locking element 62 to thereby cause movement of the locking element in a manner to be hereinafter described in more detail. Thus, when the key 24 is rotated, the tab 76 will engage the locking element 62, causing movement of the locking element 62 out of the slot 64.

By reference to FIGS. 9-11 and 15 of the drawings, it can be observed that the locking element 62 is provided with an arcuately shaped outer edge 87 which is adapted to extend into the groove 40. The locking element 62 is also provided with a somewhat central opening 88 to receive the key shank 66. The opening 88 has one flat end 90 which may be engaged by the tab 76, in the manner as illustrated in FIG. 11. In this way, when the key shank is turned in a counter-clockwise direction, it will engage the end 90 and cause movement of the locking element 62 back into the locking mechanism housing 54. When the key shank 66 is rotated in the clockwise direction, to create a locking action, the tabl 76 will move through an arcuately shaped clearance 92 of the opening 88 in the locking element 62. Moreover, as the key shank is rotated still further in the clockwise direction, reference being made to FIGS. 9-11, the tab 76 will engage a flat camming wall 94 at the edge of the opening 88, providing a camming effect, and thereby, push the locking element 62 outwardly through the opening 64. The locking element is also provided with a small opening 93 to receive a key stop 95 which may be a small abutment or boss on a T-shaped end plate 102, the latter of which is hereinafter described.

Figure 16:
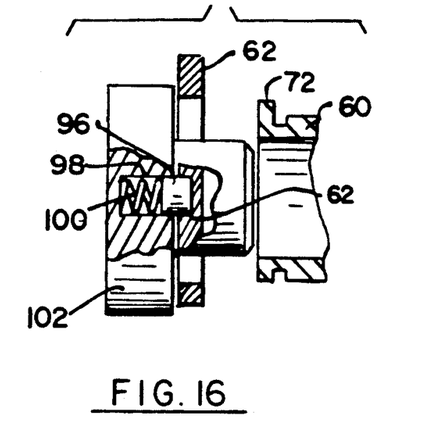
FIG. 16 is a vertical sectional view showing a portion of a plunger assembly forming part of the locking mechanism of the present invention, when the locking element is in a locked position.
Figure 17:
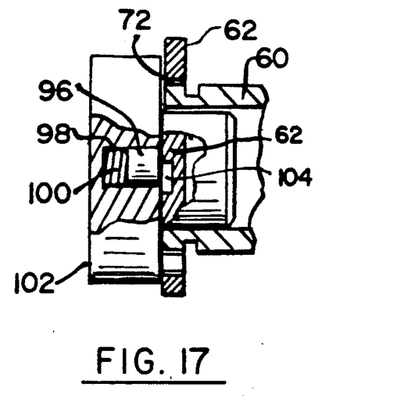
FIG. 17 is a sectional view, similar to FIG. 16, and showing the position of the plunger assembly and the locking element when the latter is in the unlocked position.
Figure 18:
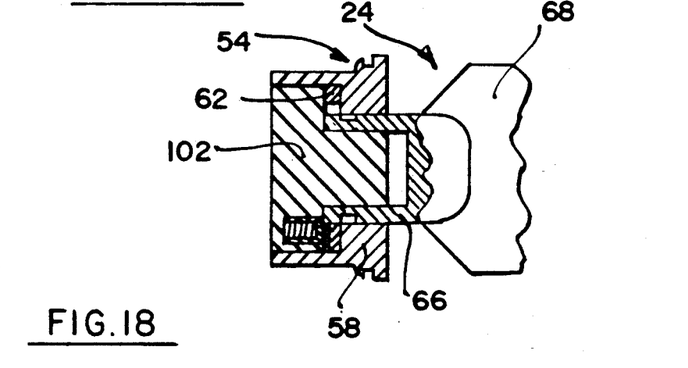
FIG. 18 is a sectional view showing a portion of the locking mechanism with a key inserted therein.

The locking mechanism is provided with a plunger 96 biased outwardly toward the flat end wall 58 by means of a spring 98, as more fully illustrated in FIGS. 16 and 17, in order to latch the locking element 62 in a locked position when the key is removed. Thus, when the key shank 66 is initially inserted into the key slot 80, the plunger will be fully depressed to the position as shown in FIG. 17. When the key is turned in the clockwise direction, it will cause the locking element 62 to move into the groove 40 of the lug nut 20 in the manner as previously described. When the key is then turned in the counter-clockwise direction, it will remove the locking element 62 from the groove 40.

Figure 9:
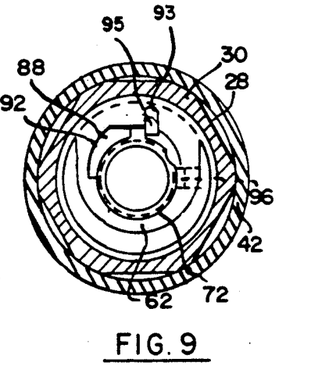
FIG. 9 is a sectional view taken along line 9—9 of FIG. 8 and showing a portion of the locking mechanism forming part of the security wheel locking system of the present invention.
Figure 19:
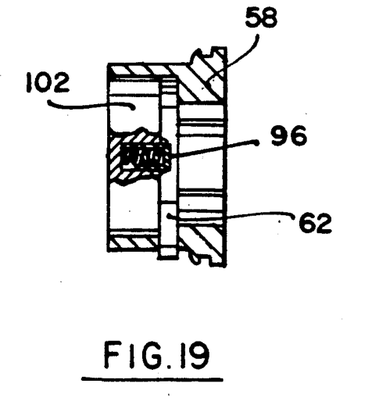
FIG. 19 is a sectional view, somewhat similar to FIG. 16, and also showing the plunger assembly forming part of the locking mechanism of the present invention when the locking element is in a locked position.
Figure 20:
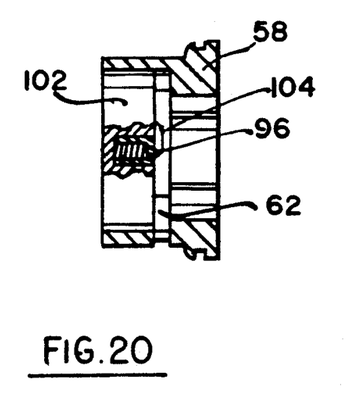
FIG. 20 is a sectional view, somewhat similar to FIG. 17 and showing the position of the plunger assembly and the locking element when the latter is in the unlocked position.

The plunger 96 and the spring 98 are retained within a cylindrically-shaped recess 100 on a somewhat T-shaped end plate 102 fitted within the inner end of the locking mechanism housing 54. The plunger 96 is biased outwardly, that is to the right, in order to engage the inwardly presented surface of the locking element 62, as illustrated in FIGS. 17 and 20. Moreover, when in the unlocked position of FIG. 17, the plunger 96 will engage the inwardly presented surface of the locking element 62. However, when the locking element 62 is pushed into the locked position, such that the edge 87 extends into the groove 40, the plunger 96 will be forced by the action of the spring 98 into an opening 104 in the form of a recess, formed in the locking element 62 when the key is removed. The plunger 96 is actually shown extended into the opening 104 when the locking element 62 has been moved into the locked position, as illustrated in FIGS. 9 and 16 and 19 of the drawings.

When it is desired to open the lock, the key is again inserted into the key slot 80, which will push the plunger 96 inwardly against the action of the compression spring 98. Moreover, when the key is turned, this will simultaneously cause movement of the locking element into the locking mechanism housing 54. The key can only be effectively removed from the locking mechanism when the latter is in the locked condition. Thus, when the key is in the unlocked position, it will be retentively held within the locking mechanism inasmuch as the tab 76 will be turned under and retentively held within the locking mechanism by means of a shoulder 108 which projects radially inwardly from the locking mechanism housing 54, in the manner as illustrated in FIG. 8. However, when the key is turned to the locked position, the key can be effectively removed from the key slot 80, and the locking mechanism will remain in the locked position. When it is desired to unlock the sleeve 22 from the lug nut 20, the key is again inserted such that the key shank moves into the key slot 80 with the tab 76 projecting into the keyway 82. When the key has been fully inserted into the key slot 80, it is then turned further in the counter-clockwise direction. As this occurs, the key will cause retraction of the locking element 62 back into the key locking mechanism housing 54, in the manner as illustrated in FIG. 11.

It can be observed in accordance with the present invention that there is no need to provide a tumbler operated locking mechanism. The projections 84 projecting into the key slot 80, along with the recesses 74 arranged on the rim 72 of the key, provide a unique security key-locking mechanism combination. Thus, unless one has a key with the precise arrangement of the recesses 74 on the rim 72 to match the projections 84 in the key slot 80, the key cannot be inserted into the key slot 80. Only that key having the properly located recesses 74 to conform to the precise location of the projections 84 and having the same spacing thereof will be afforded entry into the locking mechanism. The locking mechanism of the present invention may therefore be considered to be a non-tumbler operated lock in that it does not use a row of tumblers which are adapted to be successively actuated by teeth of a key are located such that they permit or block rotation of the key in the key receiving slot.

It can also be observed that a large number of key and locking mechanism arrangements can be provided. Thus, for example, by slightly rotating one of the projections 84 in the key slot 80 and by correspondingly rotating the position of the recess 74 on the rim 72, a second unique key and key-lock combination are provided. Moreover, by varying the sizes of the recesses and correspondingly varying the sizes of the projections in the key slot 80 will similarly cause different key and locking mechanism combinations.

Figure 21:
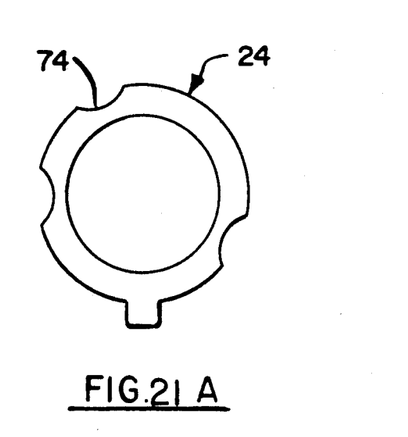
FIG. 21(A) is an end elevational view of a modified form of key which may be used in accordance with the present invention and taken substantially along the same plane of line 6—6 of FIG. 2.
FIG. 21(B) is an end elevational view of a key slot forming part of a locking mechanism with which the key of 21(A) may be used.
Figure 22:
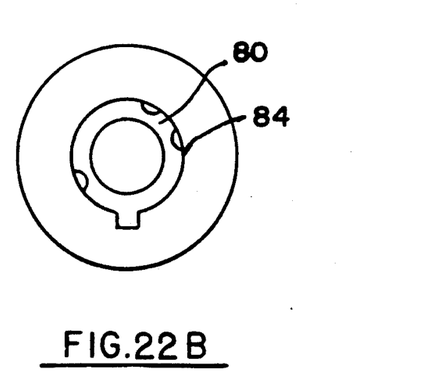
FIG. 22(A) is an end elevational view of still another modified form of key which may be used in the present invention and taken substantially along the plane of line 6—6 of FIG. 2.
FIG. 22(B) is an end elevational view of a modified form of key slot forming part of a locking mechanism with which the key of FIG. 22(A) may be used.
Figure 22A:
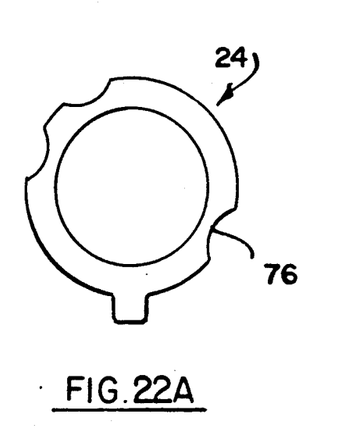

FIGS. 21(A) and 21(B) illustrate another combination of a key and key slot arrangement. One such key 24, as illustrated in FIG. 21(A), has a different spacing between the various recesses 74. By reference to FIG. 21(B), it can be observed that the projections 84 are also rotated so as to conform to the position of the recesses 74 in FIG. 21(A). FIGS. 22(A) and 22(B) illustrate another corresponding key 24 and a key mechanism having a key slot 80 of the type illustrated in FIG. 22(B). In this case, it can be observed that the recesses 74 in the key of FIG. 22(A) are aligned with the projections 84 in the key slot 80 of the key of FIG. 22(B).

The locking mechanism of the present invention is also unique in that it does not utilize tumblers. The unique configuration of the key and the key slot eliminates the need for any type of tumbler locking mechanism. The term non-tumbler operated locking mechanism and the like terms which refer to a lack of a tumbler mechanism means that the locking mechanism of the present invention does not use a row of tumblers which are adapted to be successively actuated by the teeth of a key, that is, the locking mechanism does not use a row of tumblers which are successively actuated by the teeth of a key as in many conventional tumbler operated lock mechanisms. Inasmuch as there is no need for a conventional tumbler locking mechanism, there is obviously no need for a housing with an elongate stem to operate the various tumblers. Accordingly, the key receiving member used in the locking mechanism of the present invention may have a very short length. As a result, the locking mechanism itself has a very short length, that is it is thin somewhat like a pancake type construction. Thus, all of the conventional disadvantages of tumbler operated locks located on the wheel lug nuts have been completely eliminated. Moreover, the locking mechanism itself is relatively simple in that the key itself can operate as the driver. Inasmuch as the key provides a camming action against the locking element, there is no need for a special complex locking mechanism.

The security locking system has been described in connection with the locking of a vehicle wheel lug onto a wheel. However, it should be understood that this locking mechanism could be used in a variety of situations in which a threaded member is to be locked onto a structure. Moreover, the security locking system of the present invention may be constructed as a unique combination with the locking nut or bolt, such as a wheel locking lug nut or bolt or similar nut or bolt, the sleeve which carries the locking mechanism, and the key therefor. Otherwise, the sleeve carrying the locking mechanism and the key could be adapted as a unique combination for existing lug nuts and bolts which can be provided with the internal groove for receiving the locking element.

Thus, there has been illustrated and described, a unique and novel security locking system which does not require the provision of a conventional tumbler operated locking mechanism and which thereby fulfills all of the objects and advantages which have been sought. It should be understood that many changes, modifications, variations and other uses and applications will become apparent to those skilled in the art after considering this specification and the accompanying drawings. Therefore, any and all such changes, modifications, variations, and other uses and applications which do not depart from the spirit and scope of the invention are deemed to be covered by the invention.

Having thus described the invention, what I desire to claim and secure by Letters Patent is:

1. A non-tumbler key operated lock mechanism which may be constructed in a small compact size, said lock mechanism comprising:
   a) a body having a central bore and a locking element receiving slot formed therein,
   b) a slidable locking element disposed in said locking element receiving slot and capable of shifting movement in said slot from a non-locking position in the body outwardly of the body to a locking position, said locking element also having a recess therein,
   c) a plate located with respect to said central bore,
   d) a plunger retained by the plate and extendable through a portion of said central bore into a position where it may extend into said recess in said locking element to hold the latter in the locking position and which may be biased out of the recess to permit a movement of the locking element to the non-locking position,
   e) means on said locking element to coact with a key and cause a movement of the locking element through a camming action with movement of the key,
   f) a key receiving opening formed in an end wall of the body and sized to receive the shank of a key, and
   g) means associated with said key receiving opening to coact with the key and provide key combinations to thereby determine if the key has a proper configuration to open and close the lock mechanism.

2. A security locking system for lockably mounting with respect to a threaded structure and having a length in the axial dimension which is relatively small, said locking system comprising:
   a) a threaded retaining member for mounting to said threaded structure and which threaded member has a body with an interior bore,
   b) a groove also formed in the interior bore of said body,
   c) a sleeve extendable over said threaded retaining member and enclosing said threaded retaining member to an extent sufficient to preclude removal of the threaded retaining member from the threaded structure,
   d) a non-tumbler operated locking mechanism on said sleeve, said locking mechanism having a locking mechanism body with a key receiving opening and which locking mechanism may receive a key having the shape of said key receiving opening,
   e) a key having an elongate key shank for use with said locking system,
   f) a locking element forming part of said locking mechanism and being capable of extending outwardly from the body of said locking mechanism and into said groove to lockably hold said sleeve on said threaded retaining member,
   g) a combination of a plurality of irregularly and non-symmetrically arranged projections and similarly irregularly and non-symmetrically arranged recesses associated with the key and with the key receiving opening to enable a locking action and opening action of the locking system, said recesses and projections extending for only a relatively short distance along the axial dimension of the body of the locking mechanism and said key so as to provide a relatively short axial dimension to the locking mechanism, said key being enabled access to said key receiving opening and being permitted to rotate therein to cause movement of the locking element only if the recesses are oriented and aligned with the projections but which will not be enabled access and will not rotate in said key receiving opening and open said locking system if the recesses are not oriented and alignable with the projections to thereby control movement of the locking element, and
   h) means coacting between said key and said locking element to cause movement of the locking element independently of the projections and recesses if the recesses and projections are aligned and oriented.

3. The security locking system of claim 2 further characterized in that the projections all have the same size and shape and the recesses all have the same size and shape.

4. The security locking system of claim 3 further characterized in that the means coacting comprises a tab which projects outwardly from said key shank and is extendable into a tab receiving slot communicating with said opening to ensure an insertion of the key shank into the opening only in a single orientation.

5. A non-tumbler key operated locking assembly, said locking assembly comprising:
   a) a body having an opening therein,
   b) a locking element located in said body and capable of extending outwardly of said body through said opening into engagement with an external structure to create a locking action and said locking element capable of being moved back into said body to permit unlocking,
   c) a circularly shaped key receiving opening on said body to receive a key,
   d) a plurality of projections extending into said key receiving opening, said projections having the same size and shape and being irregularly and non-symmetrically spaced around the opening,
   e) a key provided for use with said locking assembly, said key having an elongate circularly shaped shank, a plurality of irregularly spaced recesses on the shank of said key and which recesses have the same size and shape, said recesses on said shank being sized and shaped to receive and allow the projections in said opening to be fitted into the recesses such that said key is enabled access to said key receiving opening to cause movement of said locking element if said recesses are oriented and aligned with the projections but which will not be enable access to said key receiving opening if the recesses are not orientable and alignable with the projections, and
   f) a tab located on said key and which is engagable with said locking element for movement of said locking element through a camming action when said key is inserted into the opening of said body.

6. A non-tumbler key operated locking assembly and having a length in an axial dimension which is relatively small, said locking assembly comprising:
   a) a body having a locking element opening therein,
   b) a locking element located in said body and capable of extending outwardly of said body through said opening into engagement with an external structure to create a locking action and said locking element capable of being moved back into said body to permit unlocking,
   c) an elongate circularly shaped key receiving opening extending axially into said body to receive a key,
   d) a plurality of projections extending into said key receiving opening, said projections having the same size and shape and being irregularly and non-symmetrically spaced around the opening, the projections only extending for a relatively short distance along the axial dimension of the body so as to provide a relatively short axial dimension to the body of the locking assembly,
   e) a key provided for use with said locking assembly, said key having an elongate circularly shaped shank, a plurality of irregularly spaced recesses on the shank of said key and which recesses have the same size and shape, the recesses also having a relatively short axial dimension relative to the axial dimension of the body so as to further enable the body and the locking assembly to have a relatively short axial dimension, said recesses on said shank being sized and shaped to receive and allow the projections in said opening to be fitted into the recesses such that said key is enabled access to said key receiving opening and is allowed to rotate in said opening to cause movement of said locking element if said recesses are oriented and aligned with the projections but which will not be enabled access to said key receiving opening and will not be allowed to rotate in said opening if the recesses are not orientable and alignable with the projections, and
   f) a tab located on said key and which is engagable with said locking element for movement of said locking element through a camming action when said key is inserted into the opening of said body, said tab causing movement of said locking element independently of the projections and recesses if the recesses have the same positioning and are arranged and sized to receive the projections which allows rotation of the key in the opening.

7. The locking assembly of claim 6 further characterized in that the projections extending into said key receiving opening all lie in a single plane generally perpendicular to the axis of the opening, and the recesses on the shank generally being located in the same plane as the projections in the opening during a portion of the longitudinal movement of the key shank into the opening.

8. The locking assembly of claim 7 further characterized in that the recesses on the shank also extend for only a relatively short distance along the longitudinal dimension of said shank and being irregularly and non-symmetrically spaced around the periphery of the shank of the key, and all of the projections in said single plane extend for only a relatively short distance along the longitudinal dimension of said opening.

9. A security locking device for lockably mounting with respect to an externally threaded portion on a structure and having a length in the axial dimension which is relatively small, said locking device comprising:
   a) a threadedly mounted retaining member for threaded securement on the threaded portion of a said structure, said retaining member being comprised of:
      1) a body having an interior bore,
      2) a threaded section adapted for threaded engagement with the threaded portion of said structure,
   b) a sleeve-locking section extendable over a portion of said retaining member, said sleeve-locking section being comprised of:
      1) a sleeve extendable over said retaining member,
      2) a locking mechanism carried by said sleeve and located to be in a locking position with respect to said threadedly mounted retaining member for providing a locking action with said retaining member,
      3) said locking mechanism comprising a body with an axial dimension and with an elongate key receiving opening extending axially into said locking mechanism body and which permits access by a key to said locking mechanism, said locking mechanism having a plurality of projections extending into said opening of said body, said projections also being irregularly and non-symmetrically spaced around the opening, the projections only extending for a relatively short distance along the axial dimension of the body so as to provide only a relatively short axial dimension to the body and the locking mechanism, c) a key for locking and releasing said locking mechanism, said key being comprised of:
   1) a shank sized to extend into said key receiving opening and into said locking mechanism, and
   2) a plurality of recesses on the shank of said key and which recesses are irregularly and non-symmetrically spaced around the periphery of the shank of the key, the recesses also having a relatively short axial dimension relative to the axial dimension of the body so as to further enable the body and the entire locking mechanism to have a relatively short axial dimension, said key being adapted to fit into said key receiving opening and open the locking mechanism if the recesses are arranged to be aligned with said projections during a portion of the axial movement of the shank when the shank is inserted into said opening and said key will not fit into said opening and will not operate said locking mechanism if the recesses on said key do not have the same radial positioning as and are not arranged and sized to receive and projections, and
d) locking means actuated by said key independently of said projections and recesses if said recesses and projections have the same radial positioning and said recesses are arranged and sized to receive the projections which thereby allows the key to rotate in said opening and actuate said locking means to open or lock said locking mechanism.

10. The security locking device of claim 9 further characterized in that said opening is an arcuately shaped opening and said key shank is arcuately shaped with substantially the same radius as said opening.

11. The security locking device of claim 10 further characterized in that said opening is a circularly shaped slot and said key has a circularly shaped continuous wall and which key fits into said circularly shaped opening.

12. The security locking device of claim 11 further characterized in that each of the plurality of projections extending into said circularly shaped opening have the same size and the same shape as the plurality of recesses on said key and the irregular spacing of the projections around said opening corresponds to the irregular spacing of the recesses around the shank of said key when the key is adapted to open the lock.

13. The security locking device of claim 12 further characterized in that the plurality of irregularly spaced projections extending into the key receiving opening all lie in a single radial plane generally perpendicular to the axis of the opening, the recesses on the shank generally are located in the same radial plane as the projections in the opening during a portion of the axial movement of the key shank when the shank is inserted into the opening.

14. The security locking device of claim 12 further characterized in that all of the projections extend for only a relatively short distance along the axial dimension of said opening and the recesses on the shank also extend for only a relatively short distance along the axial dimension of said shank and being irregularly and non-symmetrically spaced around the periphery of the shank of the key.

15. The security locking device of claim 12 further characterized in that:
   a) said plurality of irregularly spaced projections in said key receiving opening all lie in a single radial plane generally perpendicular to the axis of the opening and where all of the projections in said single radial plane extend for only a relatively short distance along the axial dimension of said opening, and
   b) the recesses on the shank generally are located in the same radial plane as the projections in the opening during a portion of the axial movement of the key shank into the opening, the recesses on the shank also extending for only a relatively short distance along the axial dimension of said shank and being irregularly and non-symmetrically spaced around the periphery of the shank of the key in said single radial plane.

16. The security locking device of claim 9 further characterized in that said locking means comprises an extendable locking element which extends into and out of said locking mechanism, and said threadedly mounted retaining member has a groove therein arranged to receive said extendable locking element such that the sleeve may rotate about but cannot be removed from the threadedly mounted retaining member when the locking element extends into said groove.

17. The security locking device of claim 16 further characterized in that a tab projects outwardly from said key shank and is extendable into a tab receiving slot in communication with said key receiving opening to ensure an insertion of the key shank into the opening only in a single orientation.

18. The security locking device of claim 17 further characterized in that a camming means exists between said projecting tab on said key and said locking element which causes movement of said locking element by a camming action.

19. A security locking system for lockably mounting onto a threaded structure, said locking system comprising:
   a) a threaded retaining member for mounting to said threaded structure and which threaded retaining member has a body with an interior bore,
   b) a groove also formed in the interior bore of said body,
   c) a sleeve extendable over said threaded retaining member and enclosing said threaded retaining member to an extent sufficient to preclude removal of the threaded retaining member from the threaded structure,
   d) a non-tumbler operated locking mechanism on said sleeve, said locking mechanism having a body with an arcuately shaped key receiving opening and which locking mechanism may receive a key having the arcuate shape of said key receiving opening, and
   e) a plurality of projections extending into said arcuately shaped key receiving opening, said projections also being irregularly and non-symmetrically spaced around the opening,
   f) a key having an arcuately shaped key shank for use with said locking system and having a plurality of recesses on the shank of said key, said recesses being irregularly and non-symmetrically spaced around the periphery of the shank of the key,
   g) a locking element forming part of said locking mechanism and being capable of extending outwardly from the body of said locking mechanism and into said groove to lockably hold said sleeve on said threaded member, and
   h) said key being enabled access to said key receiving opening to cause movement of the locking element only if the recesses on the shank are oriented and aligned with the projections but which will not be enabled access if the recesses are not oriented and alignable with the projections to thereby control movement of the locking element.

20. The security locking system of claim 19 further characterized in that the projections in the key receiving opening of said locking mechanism all have the same size and shape and that the recesses on said shank all have the same size and shape.

21. The security locking system of claim 19 further characterized in that a tab projects outwardly from said key shank and is extendable into a tab receiving slot communicating with said opening to ensure an insertion of the key shank into the opening only in a single orientation.

22. The security locking system of claim 19 further characterized in that the projections extending into said arcuately shaped key receiving opening all lie in a single radial plane generally perpendicular to the axis of the opening, and the plurality of irregularly spaced recesses on the shank of said key all lie in a single radial plane generally perpendicular to the axis of the arcuately shaped shank, the recesses on the shank generally being located in the same radial plane as the projections in the opening during a portion of the axial movement of the key shank into the opening.

23. The security locking system of claim 19 further characterized in that all of the projections extend for only a relatively short distance along the axial dimension of said opening, and the recesses on the shank also extend for only a relatively short distance along the axial dimension of said shank and being irregularly and non-symmetrically spaced around the periphery of the shank of the key.

24. A security locking device for lockably mounting with respect to an externally threaded portion on a structure, said locking device comprising:
   a) a threadedly mounted retaining member for threaded securement on the threaded portion of a said structure, said retaining member being comprised of:
      1) a body having an interior bore,
      2) a threaded section adapted for threaded engagement with the threaded portion of said structure,
   b) a sleeve-locking section extendable over a portion of said retaining member, said sleeve-locking section being comprised of:
      1) a sleeve extendable over said retaining member,
      2) a locking mechanism carried by said sleeve and located to be in a locking position with respect to said threadedly mounted retaining member for providing a locking action with said retaining member,
      3) an arcuately shaped key receiving opening in said locking mechanism which permits access by a key to said locking mechanism, said locking mechanism having a plurality of projections extending into said opening, said projections also being irregularly and non-symmetrically spaced around the opening,
   c) an arcuately shaped key for locking and releasing said locking mechanism, said key being comprised of:
      1) a shank sized to extend into said key receiving opening and into said locking mechanism, and
      2) a plurality of recesses on the shank of said key and which recesses are irregularly and non-symmetrically spaced around the periphery of the shank of the key, said key being adapted to fit into said key receiving opening and open the locking mechanism if the recesses are arranged to be aligned with said projections during a portion of the axial movement of the shank when the shank is inserted into said opening and said key will not fit into said opening and will not operate said locking mechanism if the recesses on said key do not have the same radial positioning as and are not arranged and sized to receive said projections.

25. The security locking device of claim 24 further characterized in that said opening is a circularly shaped slot and said key has a circularly shaped continuous wall and which key fits into said circularly shaped opening.

26. The security locking device of claim 25 further characterized in that each of the plurality of projections extending into said circularly shaped opening have the same size and the same shape as the plurality of recesses on said key and each have the irregular spacing of the projections around said opening which corresponds to the irregular spacing of the recesses around the shank of said key when the key is adapted to open the lock.

27. The security locking device of claim 26 further characterized in that the plurality of irregularly spaced projections extending into the key receiving opening all lie in a single radial plane generally perpendicular to the axis of the opening, the recesses on the shank generally are located in the same radial plane as the projections in the opening during a portion of the axial movement of the key shank when the shank is inserted into the opening.

28. The security locking device of claim 26 further characterized in that all of the projections extend for only a relatively short distance along the axial dimension of said opening and the recesses on the shank also extend for only a relatively short distance along the axial dimension of said shank and being irregularly and non-symmetrically spaced around the periphery of the shank of the key.

29. The security locking device of claim 26 further characterized in that:
   a) said plurality of irregularly spaced projections in said key receiving opening all lie in a single radial plane generally perpendicular to the axis of the opening and where all of the projections in said single radial plane extend for only a relatively short distance along the axial dimension of said opening, and
   b) the recesses on the shank generally are located in the same radial plane as the projections in the opening during a portion of the axial movement of the key shank into the opening, the recesses on the shank also extending for only a relatively short distance along the axial dimension of said shank and being irregularly and non-symmetrically spaced around the periphery of the shank of the key in said single radial plane.

* * * * *